Patented Oct. 7, 1924.

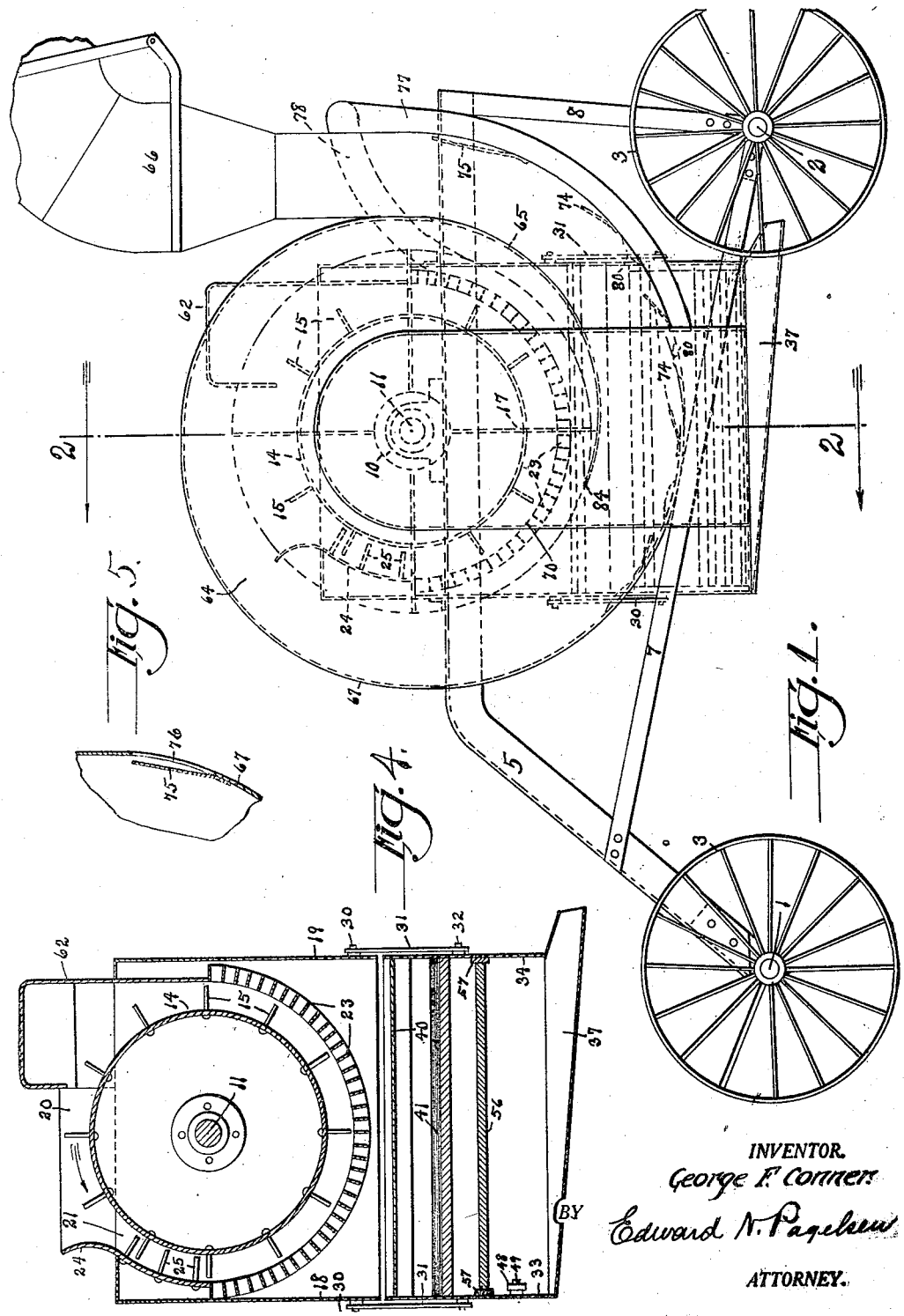

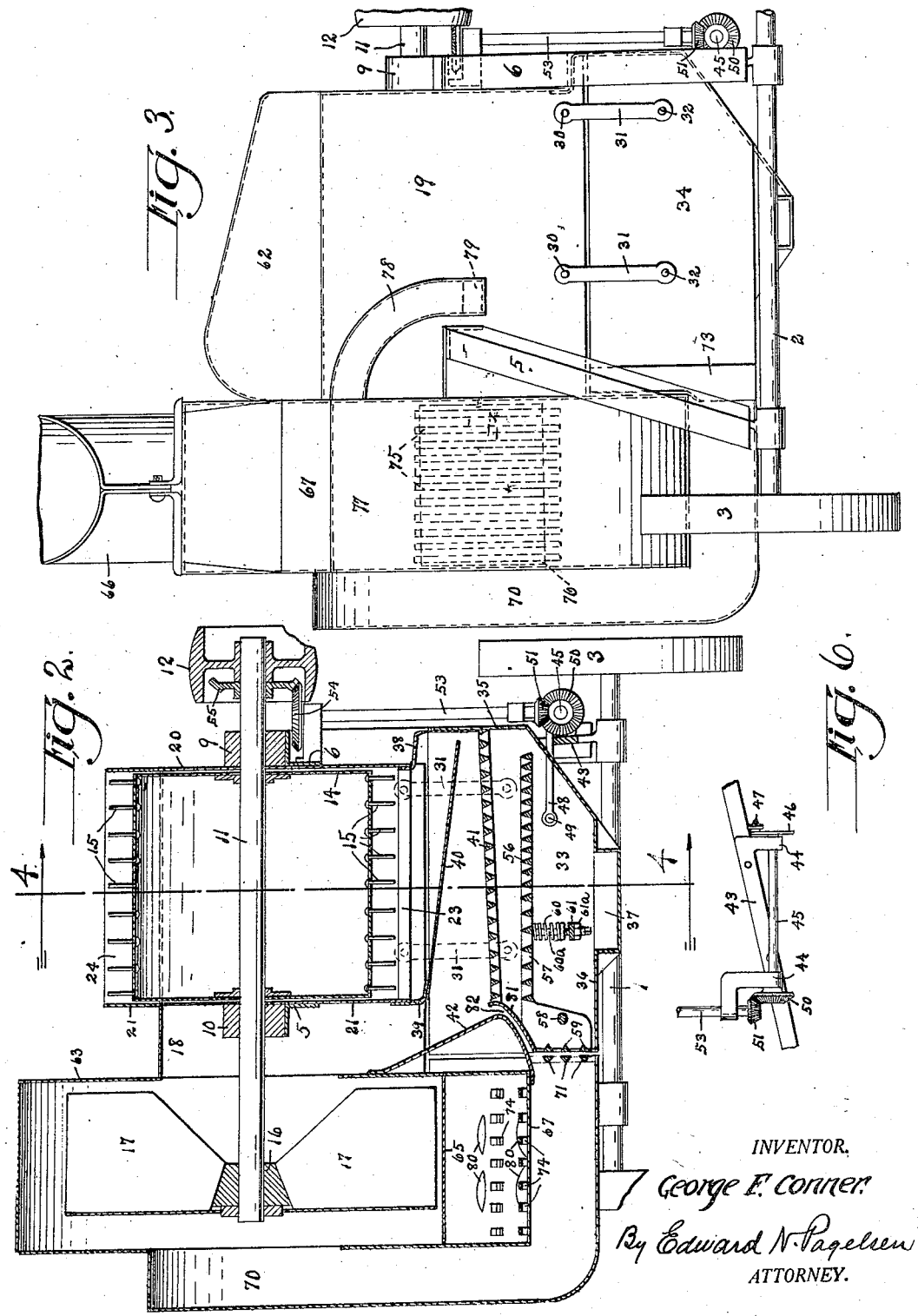

1,510,658

UNITED STATES PATENT OFFICE.

GEORGE F. CONNER, OF PORT HURON, MICHIGAN.

THRASHING MACHINE.

Application filed September 12, 1921. Serial No. 500,080.

*To all whom it may concern:*

Be it known that I, GEORGE F. CONNER, a citizen of the United States, and residing at Port Huron, in the county of St. Clair and State of Michigan, have invented a new and Improved Thrashing Machine, of which the following is a specification.

This invention relates to grain thrashing machines having rotating cylinders and a reciprocating cleaning shoe and its object is to provide a thrashing machine which shall be of minimum size and weight for its capacity and which will recover substantially all the grain.

This invention consists in a frame and wheels to support the frame, a shaft mounted on the frame, a thrashing cylinder and a fan secured to the shaft, a stationary screen extending partly around the cylinder. a housing extending around the fan, a cleaning shoe and screens below the cylinder and its stationary screen, means to reciprocate the shoe, and air passages to carry the chaff from the cleaning shoe to the fan. It further consists in a spiral discharge passage for the fan and means to loosen and lift the straw from the outer wall of this passage to permit the grain to move out to a grating in this wall through which it may escape to a transverse passage adapted to convey the grain to the cleaning shoe. It also consists in the details of construction illustrated in the accompanying drawings and particularly pointed out in the claims.

In the drawings, Fig. 1 is a side elevation of a thrashing machine embodying the present invention. Fig. 2 is a section on the line 2—2 of Fig. 1. Fig. 3 is a rear elevation of this machine. Fig. 4 is a section on the line 4—4 of Fig. 2. Fig. 5 is a detail of a grating in the outer wall of the fan housing. Fig. 6 is a detail of the shaft to reciprocate the cleaning shoe.

Similar reference characters refer to like parts throughout the several views.

The machine shown in the drawings is mounted on front and rear axles 1 and 2 which carry the wheels 3 and are connected by frame members 5, 6, 7 and 8. On the frame members 5 and 6 are mounted the bearings 9 and 10 for the main shaft 11. A pulley 12 secured on this shaft receives a belt from any desired motor, and the thrashing cylinder 14 with its smooth continuous surface and teeth 15 and fan 16 with its blades 17 may be secured to this shaft in any desired manner. The casing enclosing the cylinder 14 may be substantially rectangular, as shown in Fig. 4, and have a front wall 18, rear wall 19, outer wall 20 and a transverse partition 21. The slats 23 extend between the walls 20 and 21 and constitute a semi-cylindrical stationary screen, and a metal plate 24 usually called the concave, extends upward from the front end of this stationary screen and carries inwardly extending rows of pins 25. Cylinders have usually been constructed with a periphery of parallel bars which carry the teeth. When such a cylinder rotates at high speed, kernels of grain rebounding from the slats 23 are caught by these cylinder bars and carried along with the straw to the discharge passage for the straw, thus being lost. The smooth cylindrical surface has no such action and the kernels are deflected back directly to the screen.

The sides 18 and 19 of the casing carry pins 30 on which links 31 are mounted which, at their lower ends, receive the pins 32 on the cleaning shoe which has a front side 33, rear side 34, outer side 35 and bottom 36 which includes an inclined spout 37. The apron 38 of leather, rubber or canvas closes the space between outer wall 20 of the cylinder casing and the outer side 35 of the cleaning shoe. A plate 40 extends down from the partition 21 to nearly the outer side 35 and delivers the grain and small bits of straw mixed therewith to the screen 41 through which the grain falls, the light straw being carried up from this screen between the partition 21 and the guide plate 42 by the current of air passing to the fan. This plate 40 is attached to the cleaning shoe and connects to the partition 21 by means of a strip 39 of leather or canvas.

Mounted on the cross bar 43 are the bearings 44 for the shaft 45, which has a crank 46 at one end from whose pin 47 the connecting rod 48 extends to the pin 49 on the front side 33 of the cleaning shoe. On the other end of this shaft is a bevel gear 50 meshing with the pinion 51 at the lower end of the shaft 53 whose upper end carries a bevel gear 54 which meshes with the pinion 55 on the main shaft 11. The screen 41 and the screen 56 below it will therefore shake back and forth to cause the heavy grain to fall to the spout 37, and cause the chaff to move toward the rear end of the shoe, that is, toward the plate 42. Any other desired means may be employed to operate the shoe.

The screen bars 56 are mounted on side bars 57 which are pivoted on the rod 58 and are connected at their ends by the cross bars 59. A spring 60 mounted on a pin 60ª adjustable in the cross bar 61 supports this screen 56. This spring is adjustable with the pin 60ª and the pin may be locked by means of the nut 61ª. When the opened sheaves, which may be brought to the machine in any desired manner are dropped onto the cylinder 14, they are caught by the teeth 15 and broken and beaten on the teeth 25 and on the bars 23, the straw being thrown up into the inclined straw conveyor passage 62, open at its outer end, which connects to the inner side 63 of the fan housing. The fan blades cause a strong current of air to flow outward from their hub and to follow the spiral path between the parallel flat sides 63 and 64 of the housing, and the spiral wall extends at least one full circumference and preferably one and one fourth circumference up to the discharge elbow 66, embodying the outer wall 67 of the housing. This spiral wall 65 begins at what is known as a cut off, marked 84 in Fig. 1. This flow of air creates a strong draft in the passage 62 which carries the straw into the fan from which it is forced out to and through the elbow 66. By placing this cut off 84 well over the fingers 74 and humps 80, the kernels of grain are prevented from being thrown by the fan into the column of traveling straw which passes over these agitators.

Most of the kernels of grain and some of the chaff pass through between the bars 23 and fall onto the inclined shaking plate 40 from whose low end they fall onto the screen 41. A suction is formed by the fan below the partition 21 and a pressure of air in the upper end of the air passage 70 which extends down and then inwardly below the housing of the fan to the lower inner side of the cleaning shoe. Cross bars 71 extend across the lower inner end of this passage 70 and these are opposite the bars 59, as shown in Fig. 2. The cross bars 71 are stationary and the cross bars 59 are mounted between the side bars 57 and move around the pivot 58. These bars 59 and 71 therefore constitute a valve to regulate the admission of air at this point for it is evident that when the parts are as shown in Fig. 2, the spaces between these sets of bars are in alinement. But when the pressure of the air within the space below the screen bars 56 becomes sufficiently great to lift the kernels of grain, it is also sufficiently great, with the aid of the spring 60, to lift the frame 57 and swing down these bars 59 to reduce the effective passages between the bars 59 and 71. This variation need be but very small in any case to control this pressure. A current of air from this passage enters the cleaning shoe and passes up through the screens 56 and 41, picking up the chaff and carrying it into the fan. A plate 81 is mounted in the cleaning shoe and extends from the above upper bar 59 to the end of the screen 41, almost parallel to the plate 42, and together therewith forms a passage 82 for a strong blast of air directly from the passage 70 to the upper rear part of the cleaning shoe, which blast assists in carrying the chaff from the end of the screen 41 to the fan.

Battens 73 may be placed over the spaces between the stationary casing and the moving cleaning shoe to prevent the passage of air.

As the straw slides around the outer wall 67 of the fan housing, being held there by centrifugal force, kernels of grain which are mixed therewith being heavier, tend to move outwardly. Fingers 74 may be attached to the inner side of the outer wall 67 to lift or press the straw away from the wall to permit the kernels to move outwardly. The last fingers 75 are preferably longer and extend over an opening 76 through which the kernels may escape into a conveyer 77 which has a spout 78 which extends to an opening 79 in the side 19 above the plate 40, this lifting and loosening of the straw while sliding on the spiral side 67 may be accelerated by the humps 80 which may be formed on the side 67, as indicated in Figs. 1 and 2.

The pressure of the air in the passage 70 causes a flow of air through the spout 78 to the opening 79 which is sufficient to carry along such kernels of grain as pass through between the fingers 75. What chaff also comes with the grain is separated therefrom by the screen 41. As the pin 60ª controls the pressure within the cleaning shoe, the pressure can be kept down to where no grain is carried into the fan by the air passing up between the parts 39 and 42, the lighter chaff however, being carried up freely. The above described device for controlling the blast of air which passes into the shoe from the fan is secured to and vibrated with the cleaning shoe which results in a uniform flow of air through the grates 56 and 41.

The details of construction and proportions of the parts of this machine may all be changed by those skilled in the art without departing from the spirit of my invention as set forth in the following claims.

I claim:—

1. In a thrashing machine, a thrashing cylinder, a fan, a casing inclosing the cylinder, a housing inclosing the fan, and a cleaning shoe, said machine being provided with passages between the shoe and housing and fan for conducting air from the fan to the shoe and from the casing to the fan.

2. In a thrashing machine, a main shaft, a thrashing cylinder and a fan mounted on the shaft, and a cleaning shoe below the cylinder, said machine being provided with air passages between the fan and shoe.

3. In a thrashing machine, a main shaft, a thrashing cylinder and a fan mounted on the shaft, a cleaning shoe below the cylinder and air passages between the fan and shoe to provide a circulation of air from each to the other and means controlled by the pressure of air in the shoe to control the flow of air from the fan to the shoe.

4. In a thrashing machine, a main shaft, a thrashing cylinder and a fan mounted on the shaft and spaced away from the cylinder, the fan casing extending between the cylinder and fan, a cylindrical grate and concave extending around the cylinder, a cleaning shoe and screens therein mounted below said cylinder, and means to reciprocate the shoe.

5. In a thrashing machine, a main shaft, a thrashing cylinder and a fan mounted on the shaft in alinement with each other, a housing for the fan, a straw conveyer extending from the cylinder to the fan housing, a cleaning shoe into which the grain may fall by gravity the machine being provided with a passage leading to the fan housing from said shoe.

6. In a thrashing machine, a main shaft, a thrashing cylinder and a fan mounted on the shaft in alinement with each other, a screen below the cylinder, a housing for the fan embodying a spiral discharge passage, the outer wall of the passage being formed to lift and loosen the straw to permit the grain to move out, and also formed with a grating to permit the escape of the grain, and means to convey the recovered grain to said screen.

7. In a thrashing machine, a thrashing cylinder, a cleaning shoe, a fan and a housing therefor, having an inlet, said machine having passages leading from the cylinder and shoe to said inlet of the fan housing.

8. In a thrashing machine, a thrashing cylinder, a cleaning shoe, means to vibrate the shoe, a fan to supply a blast of air to the shoe, and blast controlling means secured to and adapted to be controlled by the movement of the shoe.

9. In a thrashing machine a thrashing cylinder, a cleaning shoe having a blast controller, and a fan, said machine being provided with an air passage leading from the shoe to the fan and a by pass at the back end of the shoe leading into the said air passage.

10. In a thrashing machine, a thrashing cylinder, a cleaning shoe adjacent the cylinder, and a fan adapted to furnish a blast for the cleaning shoe and to draw the chaff from the shoe into itself.

11. In a thrashing machine, a thrashing cylinder, a cleaning shoe under the cylinder, a fan housing, said machine being provided with air passages leading from the cylinder and shoe to the fan housing and a fan in the housing operatively connected to the cylinder.

12. In a thrashing machine, a thrashing cylinder, a cleaning shoe, a fan, a housing encircling the fan and forming an outlet for the fan and having a grain outlet, an inner wall in the housing, and agitators in the housing between the inner wall and the grain outlet.

13. In a thrashing machine, a thrashing cylinder, a cleaning shoe, a fan, a housing encircling the fan and forming an outlet for the fan and having a grain outlet, an inner wall in the housing, and agitators in the housing between the inner wall and the grain outlet, and a passage leading from the grain outlet back to the cleaning shoe.

14. In a thrashing machine, thrashing means, cleaning means, a fan, a housing for the fan, means in the fan housing to salvage the waste grain, the fan housing being provided with separate openings for the passage of the threshed straw and the salvaged grain.

15. In a thrashing machine, a fan and a housing therefor having inlet and outlet openings, a thrashing cylinder and a cleaning shoe, said machine being provided with passages leading from the thrashing cylinder and cleaning shoe to the fan-housing inlet, and means in said housing to salvage the fugitive kernels of grain.

16. In a thrashing machine, a thrashing cylinder, a cleaning shoe, a fan, and a housing for the fan having a spiral wall, the outer end of said wall of the housing extending around the fan beyond the inner end of said wall.

17. In a thrashing machine, a thrashing cylinder, a cleaning shoe, a fan, a housing for the fan, and casings for the cylinder and shoe, said machine being provided with separate passages leading from the cylinder casing and shoe casing to the fan housing.

18. In a thrashing machine, a thrashing cylinder, a fan adjacent the cylinder, a casing for the cylinder, and a housing for the fan provided with a wall having an inlet passage between the housing and casing.

19. In a thrashing machine, a thrashing cylinder, a casing for the cylinder, a fan in alinement therewith, a housing for the fan provided with an inlet smaller than the diameter of the cylinder, the casing and housing being spaced apart, and a closed connection between housing and casing.

20. In a thrashing machine, a main shaft, a thrashing cylinder and a fan mounted on the shaft, a cleaning shoe mounted transversely below the cylinder and means adapted to convey chaff and refuse from the shoe toward the fan.

GEORGE F. CONNER.